United States Patent [19] [11] 4,412,328
Homa [45] Oct. 25, 1983

[54] ELECTROMECHANICAL DEVICE DRIVE CIRCUIT FAULT DETECTION APPARATUS

[75] Inventor: John L. Homa, Lyndhurst, Ohio

[73] Assignee: The North American Manufacturing Company, Cleveland, Ohio

[21] Appl. No.: 231,498

[22] Filed: Feb. 4, 1981

[51] Int. Cl.³ ............................................. G06F 11/00
[52] U.S. Cl. .................................. 371/25; 324/73 R; 340/515; 431/24; 371/15
[58] Field of Search ...................... 371/25, 15, 23, 67; 431/24; 324/73 R; 340/514, 515, 638

[56] References Cited

U.S. PATENT DOCUMENTS

| 3,604,906 | 9/1971 | Hunter | 371/67 |
| 3,633,016 | 1/1972 | Walker | 371/25 |
| 3,648,233 | 3/1972 | Clark | 340/46 |
| 3,806,202 | 1/1974 | Ochiai | 324/73 R |
| 3,954,383 | 5/1976 | Bryant | 431/24 |
| 4,118,688 | 10/1978 | Glennon | 340/516 |
| 4,298,334 | 11/1981 | Clark et al. | 340/516 |
| 4,317,412 | 3/1982 | Bolcavage et al. | 371/25 |

Primary Examiner—Charles E. Atkinson
Attorney, Agent, or Firm—Yount & Tarolli

[57] ABSTRACT

Apparatus is disclosed for verifying the proper operation of a drive circuit (43) which controls the application of power to an electromechanical device, e.g., a manually reset circuit breaker (36). The apparatus includes means (60) for applying a control signal to the drive circuit to cause it to briefly apply power to the electromechanical device, where the interval of time over which power is applied is too brief to cause actuation of the device. Means (64) are also provided for sensing the power applied to the device to verify that the drive circuit has properly responded to the control signal.

13 Claims, 2 Drawing Figures

ELECTROMECHANICAL DEVICE DRIVE CIRCUIT FAULT DETECTION APPARATUS

BACKGROUND AND FIELD OF THE INVENTION

This invention relates to apparatus for automatically testing electromechanical device drive circuitry to verify the proper operation thereof, and more particularly to such apparatus as could be used, for example, in a combustion supervisory control system to test the circuit breaker used to conclude a combustion process in the event of faulty control circuit operation.

There are a large number of industrial endeavors which employ high energy combustion processes. For efficiency and safety, automatic control systems are often used to initiate and supervise the combustion processes. These combustion supervisory control systems automatically control the supply of fuel and oxidizer to a burner, as well as the initial purging and ignition of the burner upon start up, and shut down of the burner in the event of a flame-out or of a fault in the supervisory control system.

The shut down of the burner and the combustion process in the event of a combustion or equipment failure may be accomplished by a snap-action circuit breaker, where the circuit breaker may be reset only manually. Opening of the circuit breaker would essentially disable the combustion process, and produce a safe shut down of the system.

It would clearly be desirable to provide some means for testing the operation of such a circuit breaker shut down method. One manner of accomplishing this would be to induce a fault condition and observe whether or not the circuit breaker did in fact actuate in response to this fault condition. To do this requires the cooperation of the operator, however, since the circuit breaker is only manually resettable. It would be preferable if some fashion could be devised for instead performing this automatically.

SUMMARY OF THE INVENTION

The present invention provides apparatus for testing electromechanical device drive circuitry for verifying proper operation thereof automatically. It may find use in combustion supervisory systems as outlined above, or in any other environment wherein automatic testing of a circuit breaker or other electromechanical device and its associated drive circuitry is desired.

The apparatus includes means for applying power across the electromechanical device for a period of time which is too brief to cause the actuation of the device. Means are also provided for sensing the momentary application of power across the device in order to verify that the drive circuit has functioned correctly. A fault indication is provided in the event that the power does not momentarily appear across the device.

This operation is particularly appropriate for use in testing drive circuitry for a manually resettable circuit breaker. Since the testing of the drive circuit involves only the momentary application of power to the circuit breaker, the circuit breaker is not energized for a period of time which is long enough to produce its actuation. Operator assistance is therefore not required in resetting the circuit breaker, hence the complete process may proceed automatically.

BRIEF DESCRIPTION OF THE DRAWINGS

The foregoing and other objects and advantages of the present invention will become more readily apparent from the following detailed description, as taken in conjunction with the accompanying drawings, wherein.

DETAILED DESCRIPTION OF A PREFERRED EMBODIMENT

In the detailed description which follows, the invention will be described in the environment of a combustion supervisory control system. It will be appreciated, however, that the invention is not limited to use in this environment. The invention may, in general, conveniently find use in any application wherein it is necessary or desirable to automatically test a circuit breaker or other electromechanical device and its associated drive circuitry.

Figure 1:
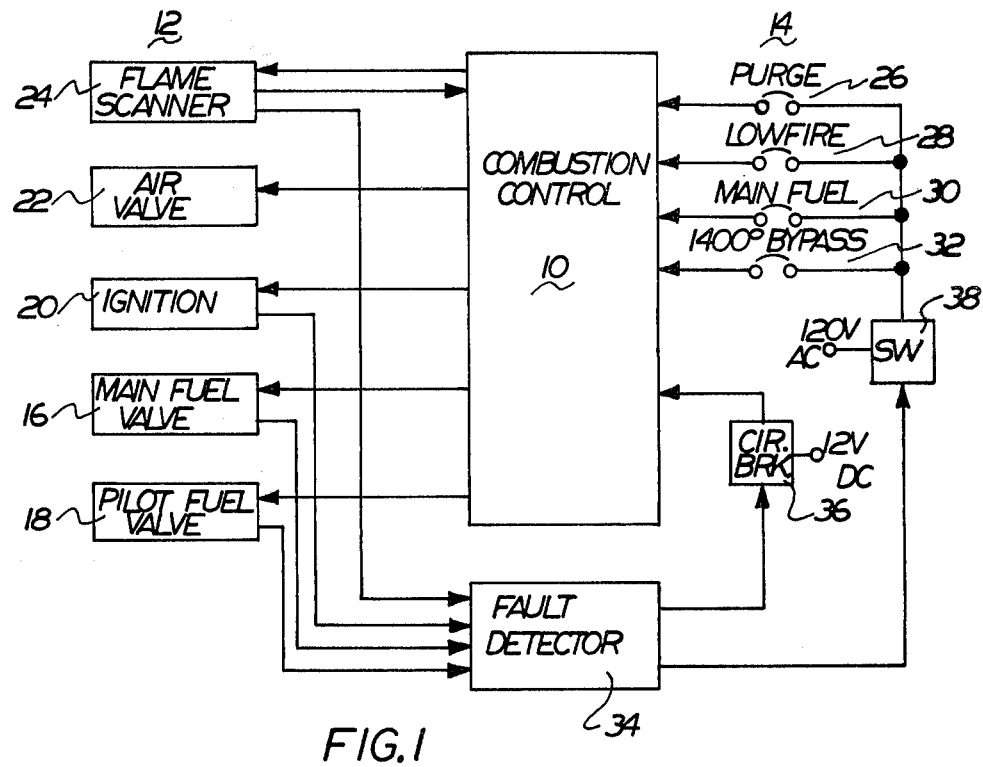
FIG. 1 is a broad block diagram of a combustion supervisory control system employing the test circuitry of the present invention.

FIG. 1 is a block diagram of a combustion supervisory control system in which the present invention may conveniently find use. As illustrated in FIG. 1, the combustion control circuit 10 controls a plurality of elements 12 associated with the combustion apparatus in accordance with the positions of a plurality of limit switches 14 also associated with the combustion system. In FIG. 1, the elements 12 which are controlled by the combustion control circuit 10 include main and pilot fuel valves 16 and 18, respectively, an ignition circuit 20, air valve 22, and a flame scanner circuit assembly 24.

The combustion control circuit 10 controls the position of the various elements 12 in accordance with the positions of the limit switches 14. In the example illustrated in FIG. 1, the limit switches 14 are four in number and include a purge limit switch 26, a low fire limit switch 28, a main fuel valve limit switch 30 and a 1400° bypass switch 32. Both the purge limit switch 26 and the low fire limit switch 28 are associated with the air valve 22, respectively representing the largest and smallest aperture available from the air valve 22. The main fuel limit switch 30 is associated with a main fuel valve 16, and will be closed when the main fuel valve is closed. The 1400° bypass switch 32 is associated with a temperature measuring device (not shown) which will close the bypass switch when the temperature within the furnace is in excess of 1400°.

Upon the initial application of power to the system, the combustion control circuit 10 will sequence through a series of operations necessary to bring the combustion apparatus into full operation, e.g., including purging of the system, pilot ignition, main burner ignition, etc. This sequence of operations will be mediated by the operation of the limit switches 26, 28, 30 and 32. After the combustion process reaches steady state operation, the combustion control circuit 10 will monitor the output of the flame scanner 24 to verify that the combustion process is proceeding normally. In the event of a flame out condition, the combustion control circuit 10 will shut down the various valves, and will reinitiate the ignition sequence upon manual reset. In the event that the 1400° bypass limit switch 32 is closed, the combustion control circuit will bypass the purging operation which normally takes place prior to ignition.

In the FIG. 1 embodiment, a fault detector circuit 34 is included for determining whether or not the various circuits which control the elements 12 of the combustion equipment are operating properly. The two fuel valves 16 and 18, as well as the ignition circuit 20 and the flame scanner 24 all provide logic signals at their output which will have predetermined values in the event of a fault within the associated drive circuitry. The fault detector circuit 34 gates these signals together and disables the combustion control circuit in the event of a fault. More particularly, the fault detector 34 provides a control signal at its output to control the status of the circuit breaker 36 which controls the application of 12 volts DC to the logic elements associated with the combustion control circuit 10. When the circuit breaker 36 opens in response to a fault condition, power is effectively removed from the combustion control circuit 10, thereby automatically shutting down the system by removing power from the main fuel valve, pilot fuel valve, ignition, etc. Circuit breaker 36 will generally be a snap action, manually reset circuit breaker.

In accordance with the present invention, the fault detector circuitry 34 will include elements for automatically verifying proper operation of the fault gating circuitry and the drive circuitry which drives the circuit breaker 36. This circuitry applies a control signal to the fault gating logic to cause power to be momentarily applied to the circuit breaker 36. The duration of application of power to the circuit breaker 36 is too brief to cause it to pull in, however. The fault detector 34 also includes elements for sensing the power applied to the circuit breaker 36, and for preventing energization of a normally open switch 38 in the event that power is not properly applied to the circuit breaker 36 in response to this test condition. As long as the switch 38 is open, power is removed from the limit switches 26-32. This prevents the combustion and control circuit 10 from initiating the ignition sequence.

Consequently, in the event that there is a fault within the fault detector circuitry 34, either in the fault gating logic or in the circuit which drives the circuit breaker 36, the switch 38 will be opened and the combustion and control circuit 10 thus prevented from initiating the combustion process. This process takes place automatically upon the initial application of power to the combustion and control system.

Figure 2:
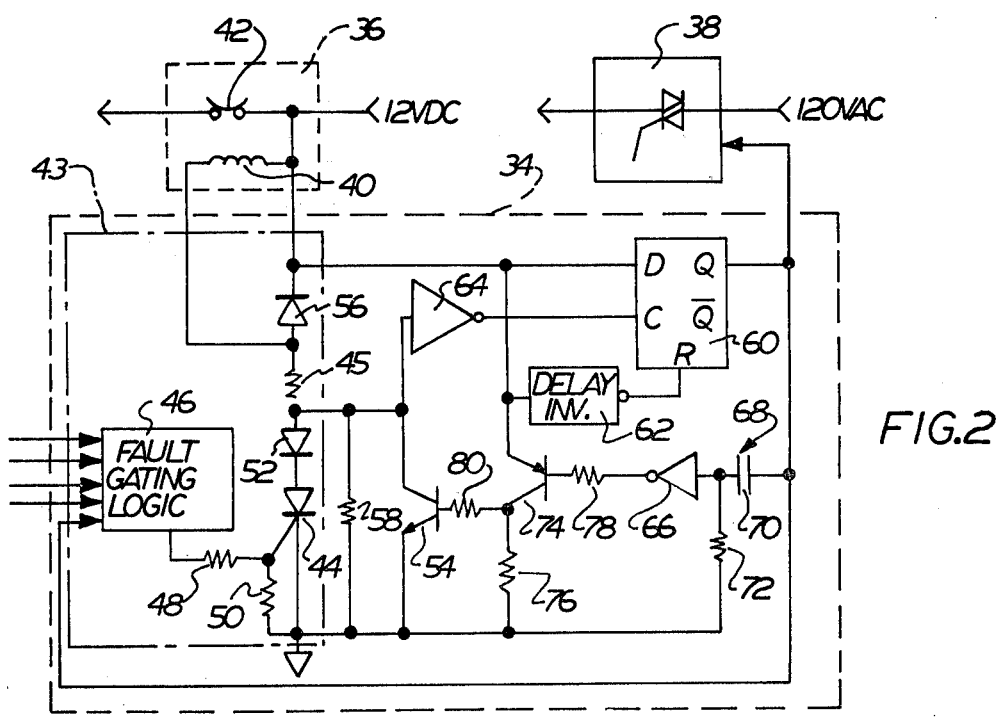
FIG. 2 is a more detailed circuit schematic of one embodiment of a circuit breaker self-testing circuit in accordance with the teachings of the present invention.

FIG. 2 illustrates the contents of the fault detector circuit 34 and the circuit breaker 36 in greater detail. Thus, the circuit breaker 36 is shown as including an actuating coil 40 and normally closed, snap action contact 42. When the relay coil 40 is energized, the snap action contacts 42 will open, thereby removing DC power from the combustion control circuit 10.

Operation of the circuit breaker 36 is controlled by a drive circuit 43. More specifically, the coil 40 is connected across the 12 volt DC power supply through the series combination of an SCR 44 and a current limiting resistor 45. The SCR 44 will normally be in a high impedance, open circuit condition so that essentially no power flows through the coil 40, whereby the contacts 42 remain closed. A fault gating logic circuit 46 monitors the fault indications provided by the various combustion control elements 12 and provides a triggering signal to the SCR 44 upon the occurrence of a fault condition. This trigger signal, which is a high logic level signal, is applied to the gate of the SCR 44 through a resistor 48 and cause it to switch to a low impedance condition. Another resistor 50 is connected between the gate of the SCR 44 and ground so as to reduce the susceptibility of the SCR 44 to false triggering.

Once triggered, the SCR 44 will remain conductive until the current passing through it drops below a minimum threshold level, known as the holding current. This characteristic is not troublesome during normal operation of the system, since it is desired and expected that the fault detecting circuit will remain triggered, unless manually reset, even afer the fault condition has cleared. During testing of the circuit breaker and its associated drive circuitry in accordance with the present invention, however, it is desired to apply power to the circuit breaker only briefly. It is therefore necessary to include circuitry for resetting the SCR shortly after triggering.

In order to switch the SCR 44 off, the fault detector circuit 34 includes a diode 52 in series with the SCR 44, and a transistor 54 in parallel with the series combination of the diode 52 and the SCR 44. The current passing through the SCR 44 will drop to zero when the voltage across the series combination of the diode 52 and the SCR 44 drops below approximately one volt. To switch off the SCR 44, the transistor 54 is triggered into a saturated condition whereby the voltage across it is approximately 0.2 volts. Since this voltage is too low to permit the series combination of diode 52 and SCR 44 to remain conductive, the SCR 44 will drop out of conduction and thus return to a high impedance condition.

A free wheeling diode 56 is connected in parallel with the coil 40 so as to suppress treatment peaks introduced by the switching of the SCR 44 between conductive and nonconductive conditions. A terminating resistor 58 connects the anode of diode 52 to ground, thereby assuring that the anode of diode 52 will be at a ground voltage level in the event of an open occurring somewhere in the current conduction path through the coil 40.

A type "D" flip-flop 60 is provided in the fault detector 34 for controlling the circuit breaker drive circuitry testing. Upon the initial application of power to the fault detector 34, flip-flop 60 will provide a signal to fault gating logic 46 simulating a fault. Upon verification that the SCR 44 has triggered properly, the flip-flop will apply a signal to the transistor 54 to turn it on, thereby resetting the SCR 44 to its high impedance state. The 120 volt switch 38 will then be energized, applying power to the limit switches 14 and thereby permitting the combustion control circuit 10 to proceed with the ignition sequence.

Upon the initial application of power to the fault detector 34, the flip-flop 60 is reset through operation of a circuit 62 which is connected to the 12 volt power line. This circuit 62 includes an RC delay circuit and an inverter (not shown separately), such that the output thereof will remain at a high voltage level for some short period of time following the first appearance of power on the 12 volt DC line which powers the fault detector 34. This brief high logic level, applied to the reset input of the flip-flop 60, resets it to the condition where the Q output thereof is at a low logic level.

The Q output of flip-flop 60 is applied to one of the inputs of the fault gating logic 46, which interprets the low logic level thereon as a fault condition. The fault gating logic 46, if operating properly, responds to this low logic level by applying a high logic level signal to the gate of the SCR 44, switching it to its low impedance state.

The anode of the diode 52 which is in series with the SCR 44 is connected to an inverter 64 whose function it is to sense the conductance state of the SCR 44 by sensing the voltage across it. The output of the inverter 64 is connected to the clock input of flip-flop 60, which has its "D" input connected to the 12 volt power line. When the SCR 44 switches on, the voltage at the input of the inverter 64 switches from a high to a low logic level, whereby the output thereof switches from a low to a high logic level. This positive-going transition clocks the flip-flop 60, causing it to transfer the voltage level appearing at its D input to the Q output thereof. The Q output therefore switches to a high logic level. This removes the fault signal from the fault gating logic 46, thereby removing the triggering signal from the SCR 44.

The Q output of flip-flop 60 is also used to momentarily turn on transistor 54 to reset the SCR. To accomplish this, the Q output of flip-flop 60 is provided to another inverter 66 through a differentiating circuit 68 consisting of a capacitor 70 and a resistor 72. The resistor 72 is connected between the input of inverter 66 and ground, whereby the input to the inverter will normally be at a ground voltage level. When the Q output of flip-flop 60 switches from a low to a high logic level, however, a positive going pulse will be produced through the operation of the differentiating circuit, and will appear at the input of the inverter 66. The inverter 66 responds by producing a negative going pulse at its output. The pulse is then inverted again by an inverting amplifier consisting of a transistor 74, a collector resistor 76 and a base resistor 78.

Normally the output of the inverter 66 will be at a high logic level, whereby the transistor 74 will normally be in a nonconductive condition. When the negative-going pulse appears on the output of inverter 66, however, base current will momentarily pass through the resistor 78, causing transistor 74 to saturate and develop a high voltage level across the collector resistor 76. This brief high voltage level is applied to the base of the transistor 54 through another base resistor 80. Thus, the transistor 54 will also momentarily switch to a conductive condition, causing the voltage appearing at the anode of the diode 52 to drop below the voltage level necessary to maintain conduction of the SCR 44. SCR 44 will therefore be reset.

As stated previously, the Q output of the flip-flop 60 also directly controls the triac switch 38 which applies power to the limit switches 14 to which the combustion control circuit 10 responds. When the Q output of flip-flop 60 is at a high logic level, switch 38 will be closed and power applied to the limit switches. If the Q output of flip-flop 60 remains at a low logic level, this switch will remain open and no power will be applied to the limit switches 14.

In summary, the Q output of the flip-flop 60 is reset to a low logic level upon the initial application of power to the system. The Q output will thereafter shift to a high logic level only if the fault detection logic and the SCR 44 have operated correctly. If all of the described circuitry operates satisfactorily, the SCR 44 will be momentarily triggered, a rising edge will appear at the output of the inverter 64, and the flip-flop 60 will be triggered to the state (high logic level) in which the switch 38 is closed and power supplied to the limit switches 14. If there is a fault within the gating logic 46 such that the trigger pulse never reaches the SCR 44, then the SCR 44 will never drop into conduction and the inverter 64 will never provide the rising edge necessary to trigger the flip-flop 60. The switch 38 will therefore remain open, and no power will be applied to the limit switches. Combustion control 10 will react to this by not initiating the combustion ignition sequence. A fault in the SCR 44 will provide a similar effect, as will an open circuit condition somewhere in the current conduction path through the coil 40.

If desired, an indicator lamp (not shown) may be provided to present a more positive indication to the operator of the reason for not entering the normal purging and ignition cycle. This indicator lamp could, for example, be connected to the output of switch 38. It will then be illuminated whenever power is applied to the limit switches and darkened when power is not applied to the limit switches. Alternatively, a suitable lamp and driving circuit could be connected to one of the outputs of flip-flop 60.

Although the invention has been described with respect to a preferred embodiment, it will be appreciated that various rearrangements and alterations of parts may be made without departing from the spirit and scope of the present invention, as defined in the appended claims.

What is claimed is:

1. Apparatus for verifying the proper operation of a drive circuit which controls the application of power to an electromechanical device comprising:
   means for applying a control signal to said drive circuit to cause said drive circuit to apply power to said electromechanical device for an interval of time too brief to cause actuation of said device;
   said drive circuit including a controlled switching element connected in series with said electromechanical device across a power source and means for controlling the conductance state of said controlled switching element; and
   means for sensing the power applied across said device to verify that power has been properly applied thereto by said drive circuit in response to said control signal;
   said apparatus being adapted for use with a drive circuit wherein said means for controlling the conductance state of said controlled switching element includes means for rendering said element conductive in response to said control signal, said element remaining conductive thereafter until the level of current passing through it drops below a limit, said apparatus further comprising reset means for causing said current to drop below said limit in order to reset said conductive element after said controlled switching element has been properly rendered conductive in response to said control signal.

2. Apparatus as set forth in claim 1 wherein said reset means comprises current conduction means connected in shunt with said switching element, said conduction means being controllably switchable between conductive and nonconductive states, and means for briefly switching said reset means to a conductive state after said controlled switching element has been properly rendered conductive in response to said control signal, whereby said reset means shunts sufficient current past said switching element that current through said switching element drops below said limit and said element thereby returns to a nonconductive state.

3. Apparatus as set forth in claim 1, wherein said controlled switching element comprises a thyristor.

4. Apparatus for verifying the proper operation of a drive circuit which controls the application of power to an electromechanical device comprising:

means for applying a control signal to said drive circuit to cause said drive circuit to apply power to said electromechanical device for an interval of time too brief to cause actuation of said device; and means for sensing the power applied across said device to verify that power has been properly applied thereto by said drive circuit in response to said control signal;

wherein said control signal applying means comprises bistable means having an output coupled to said drive circuit, said bistable means having a first stable state in which said control signal is applied to said output and a second stable state in which said control signal is removed from said output, first means for setting said bistable means into said first stable state so that said control signal is applied to said drive circuit, and second means for setting said bistable means into said second stable state in response to the application of power to said electromechanical device so that said control signal is removed from said drive circuit whereby said control signal is quickly and automatically removed from said drive circuit in response to the proper application of power to said electromechanical drive.

5. Apparatus as set forth in claim 4, wherein said first means comprises means for setting said bistable means to said first state upon the application of power to the system.

6. Apparatus as set forth in claim 4 wherein said means for sensing comprises means for providing a sense signal having a state which indicates whether power is or is not being applied to said electromechanical device, and wherein said second means comprises means for providing said sense signal to said bistable means whereby said bistable means is set to said second stable state in response to a given state of said sense signal.

7. Apparatus as set forth in claim 4, and further comprising means responsive to said output of said bistable means for disabling other apparatus when said means is not set into said second stable state.

8. Apparatus for use in a supervisory control system which controls combustion ignition and operation, said system including a circuit breaker drive circuit which actuates a circuit breaker in response to one or more fault indications to cause said combustion to be quenched, said apparatus comprising means for testing said circuit breaker drive circuit for proper operation prior to combustion ignition, comprising:

means for applying a simulated fault signal to said drive circuit to cause said drive circuit to apply power to said circuit breaker for an interval which is too brief to cause actuation of said circuit breaker, means for sensing the power applied across said circuit breaker to verify that power has been properly applied thereto in response to said simulated fault signal and for providing a signal indicative thereof; and means coupled to said sensing means for disabling said combustion ignition unless said signal indicates that power was properly applied to said circuit breaker by said drive circuit in response to said simulated fault signal.

9. Apparatus as set forth in claim 8, wherein said means for applying a simulated fault signal to said drive circuit comprises bistable means having an output coupled to said drive circuit, said bistable means having a first stable state in which said simulated fault signal is applied to said drive circuit and a second stable state in which said simulated fault signal is removed from said drive circuit, and means for controlling the state of said bistable means.

10. Apparatus as set forth in claim 9 wherein said means for controlling the state of said bistable means comprises first means for setting said bistable means into said first stable state prior to combustion ignition, and means for setting said bistable means into said second stable state when said sensing means senses that power has been properly applied to said circuit breaker in response to said simulated fault signal.

11. Apparatus as set forth in claim 10, wherein said means for disabling includes means responsive to the state of said bistable means for disabling said combustion ignition as long as said bistable means is in said first stable state.

12. Apparatus as set forth in claim 9, adapted for use in a supervisory control system wherein said circuit breaker drive circuit includes a controlled switching element connected in series with said circuit breaker across a power source, and means for switching said controlled switching element into a conductive state responsive to said fault indications, said apparatus further comprising means for resetting said controlled switching element to a nonconductive state when said bistable means switches from said first stable state to said second stable state.

13. Apparatus as set forth in claim 12, adapted for use in a supervisory control system wherein said controlled switching element is an SCR, said SCR remaining in a conductive condition until the current passing through it drops below the holding current for that SCR, said resetting means comprising means for briefly shunting current past said SCR when said bistable means switches from said first stable state to said second stable state, whereby the level of current passing through said SCR then drops below said holding current, returning said SCR to its nonconductive state.

* * * * *